United States Patent
Matsuura

Patent Number: 5,174,099
Date of Patent: Dec. 29, 1992

[54] MOWING MACHINE USING A POWER-TRANSMISSION MECHANISM INCORPORATED WITH AN ANNULAR GEAR

[75] Inventor: Masatoshi Matsuura, Hyogo, Japan

[73] Assignee: Matsuura Sangyo Co., Ltd., Hyogo, Japan

[21] Appl. No.: 710,279

[22] Filed: Jun. 4, 1991

[30] Foreign Application Priority Data

Jun. 5, 1990 [JP] Japan .................. 2-147581

[51] Int. Cl.$^5$ ............................. A01D 34/68
[52] U.S. Cl. ......................... 56/12.1; 56/255; 56/295; 30/276
[58] Field of Search .............. 56/12.1, 12.7, 255, 56/295; 30/276

[56] References Cited

U.S. PATENT DOCUMENTS

| | | | |
|---|---|---|---|
| 2,976,665 | 3/1961 | Speckman | 56/255 |
| 3,618,304 | 11/1971 | Hundhausen | 56/255 X |
| 3,631,658 | 1/1972 | Green | 56/11.3 |
| 4,987,732 | 1/1991 | Terai et al. | 56/295 X |
| 4,998,401 | 3/1991 | Terai et al. | 56/295 X |

Primary Examiner—Terry Lee Melius
Attorney, Agent, or Firm—Koda and Androlia

[57] ABSTRACT

A mower with a power-transmission mechanism made up with an outer ring gear and an annular gear set inside the outer ring gear with the outer teeth meshed with inner teeth of the outer ring gear. Inner teeth of the annular gear are meshed with the teeth of a central gear installed inside the annular gear. The number of teeth of the three gears are slightly different, and the gears are arranged so that the outer ring gear and the central gear are on a same center axis with the annular gear off the center axis. By driving the annular gear, the outer ring gear and the central gear are rotated in the opposite direction. Accordingly, blade wheels mounted on these two gears are turned in the opposite direction, thus cutting the grass efficiently.

3 Claims, 6 Drawing Sheets

MOWING MACHINE USING A POWER-TRANSMISSION MECHANISM INCORPORATED WITH AN ANNULAR GEAR

BACKGROUND OF THE INVENTION

1. Field of the Invention

The present invention relates to a mowing machine and more particularly to a power transmission mechanism used in a mowing machine wherein two blades at the end of a handle are rotated via gear mechanism in the opposite direction.

2. Prior Art

In conventional mowing machines, the power of an engine (power source) is transmitted to a single blade wheel. More specifically, the blade wheel is rotated by the power source at a very high speed and cutting edge formed around the blade wheel cuts the grass and shrubs, and grass clippings are thrown out by the centrifugal force of the blade wheel.

This design, however, can be very dangerous. If the blade wheel touches the operator's leg, he would be seriously injured. It is also very dangerous if the blade wheel flips gravel or if it is damaged or loses its rotational balance. These would cause the entire machine to be uncontrollable.

In order to solve these problems, the inventor of the present application proposed a mowing machine. Such a machine is disclosed in Japanese Utility Model Application Laid-Open ("Kokai") No. 1-84533. This device cuts the grass in a similar manner as in scissors. That is, two blade wheels with the cutting edges rotate sliding on each other. However, making a power-transmission mechanism that reduces the high-speed engine revolution mechanism and transmits rotations in two different directions with publicly known spur gears requires a complicated structure which requires a great number of gears. Also, such a structure tends to be too heavy for a mowing machine to carry.

SUMMARY OF THE INVENTION

Accordingly, it is a primary object of the present invention is to solve the problems in the prior art by employing a power-transmission mechanism comprising a minimum number of combination of gears that reduce the high-speed revolution directly taken out of a power source (such as an engine) to rotate two blade wheels in the opposite direction, thus making a small, light and easy-to-use two-blade mowing machine.

It is another object of the present invention to provide a mowing machine which comprises two blade wheels that rotate in the opposite direction while sliding on each other, in which blades formed on the outer circumferences of the blade wheels mow grass in such a way as a pair of scissors shearing the grass.

It is still another object of the present invention to provide a mowing machine wherein operating levers are mounted on the handle of the mowing machine, and a shoulder strap is attached to the handle so that the entire body of the mowing machine can be carried over the shoulder for easy operation.

The power-transmission mechanism of the present invention comprises a large ring gear (circular gear with teeth on the inside), an annular gear having teeth on both the inner and outer circumferences, and a small gear provided on the same axis as the large ring gear.

The difference in the number of teeth formed on the ring gear and on the outer circumference of the annular gear, which are meshed each other, is set very small, for example just one. Likewise, the difference in the number of teeth of the small gear and of teeth on the inner circumference of the annular gear is also set very small so that the annular gear and the small gear are meshed with each other at the opposite position from the meshing position of the above ring gear and the annular gear.

Of the gears above, the annular gear functions as an input gear and revolves eccentrically rather than concentrically. The ring gear that rotates while meshing with the annular gear functions as a first driven gear, and the small gear functions as a second driven gear. One of these ring gear and small gear is fixed to the upper blade wheel, and the other fixed to the lower blade wheel.

When the annular gear revolves, the ring gear and small gear that meshes the annular gear rotate in the opposite direction.

If the difference between the number of outer teeth of the annular gear and the number of teeth of the ring gear is one, the number of rotations of the ring gear equals one divided by the number of revolutions of the annular gear. Likewise, when the difference between the number of inner teeth of the annular gear and the number of teeth of the small gear is one, the number of rotations of the small gear equals one divided by the number of its teeth. The eccentric revolution of the annular gear is generated, for example, by designing a part of the driving shaft for the engine to be an eccentric shaft and using a bearing.

Accordingly, the upper blade wheel and the lower blade wheel that are on the same axis rotate in the opposite direction at a revolution reduced at a large reduction ratio.

BRIEF DESCRIPTION OF THE DRAWINGS

The accompanying drawings illustrate one embodiment of the present invention, wherein.

DETAILED DESCRIPTION OF THE INVENTION

One embodiment of the present invention will be described below with reference to the accompanying drawings.

Figure 1:
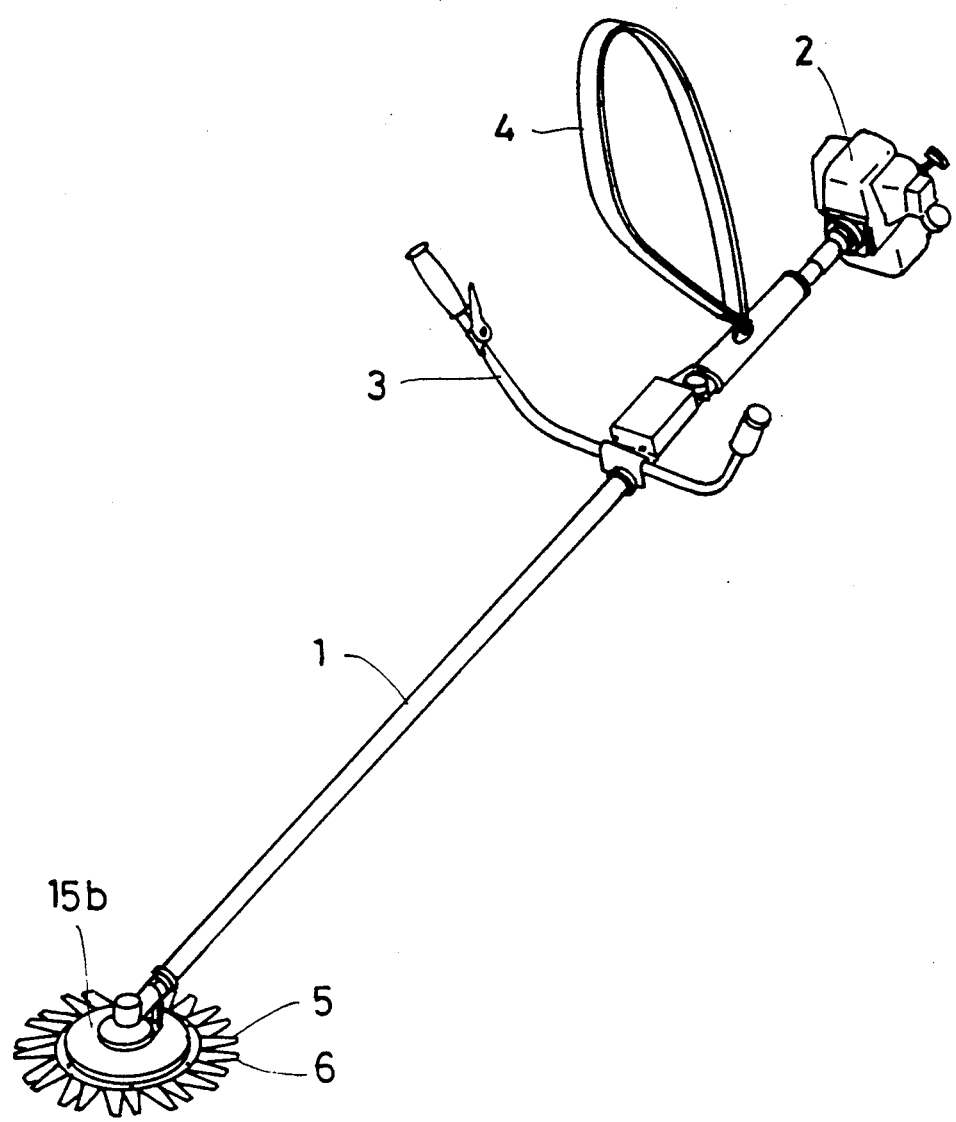
FIG. 1 is a perspective view of the entire mowing machine.

FIG. 1 shows an entire body of the mowing machine. This mowing machine includes a small engine 2 fixed at the fore end of a handle 1 and a pair of rotatable blade wheels 5 and 6 provided at the far end. Reference numeral 3 is an operating lever and 4 is a shoulder strap to carry the mowing machine.

Figure 2:
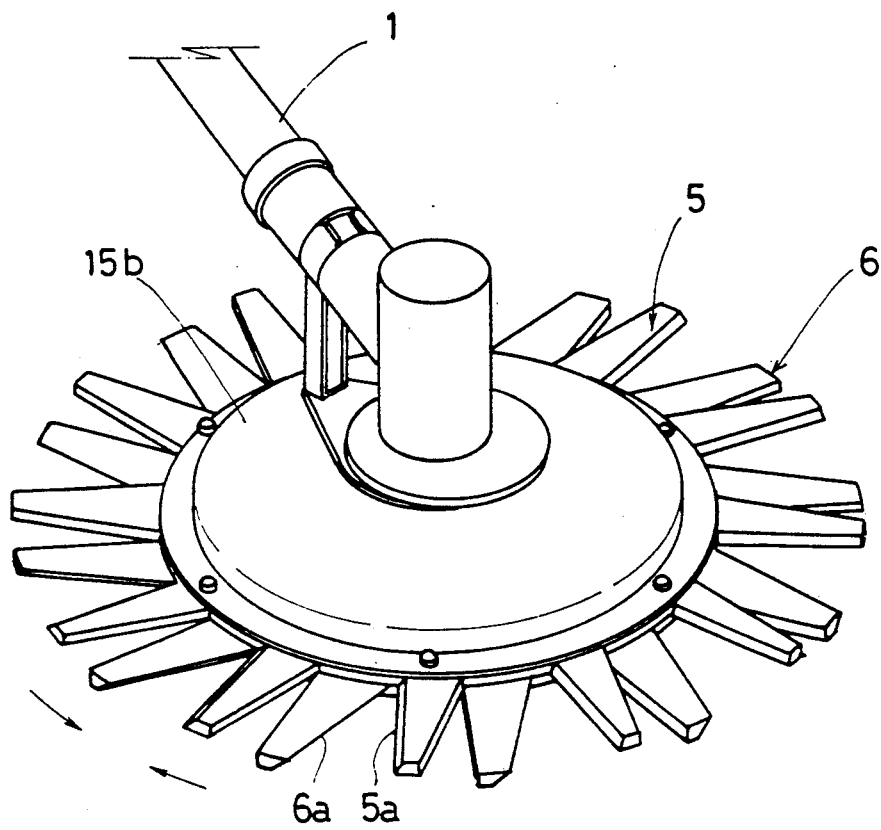
FIG. 2 is a perspective view showing only the mowing section of the mowing machine.

As shown in FIG. 2, the pair of blade wheels consists of an upper blade wheel 5 and a lower blade wheel 6.

These wheels rotate in the opposite direction (as explained below). Sharp cutting edges 5a and 6a are formed on forward edges of the blades that protrude radially on each blade wheel.

When mowing with this mowing machine, the handle 1 is held so that its far end inclines downward. Therefore, the direction of the handle 1 and the direction of the drive shaft of the blade wheel cross at an acute angle.

Figure 3:
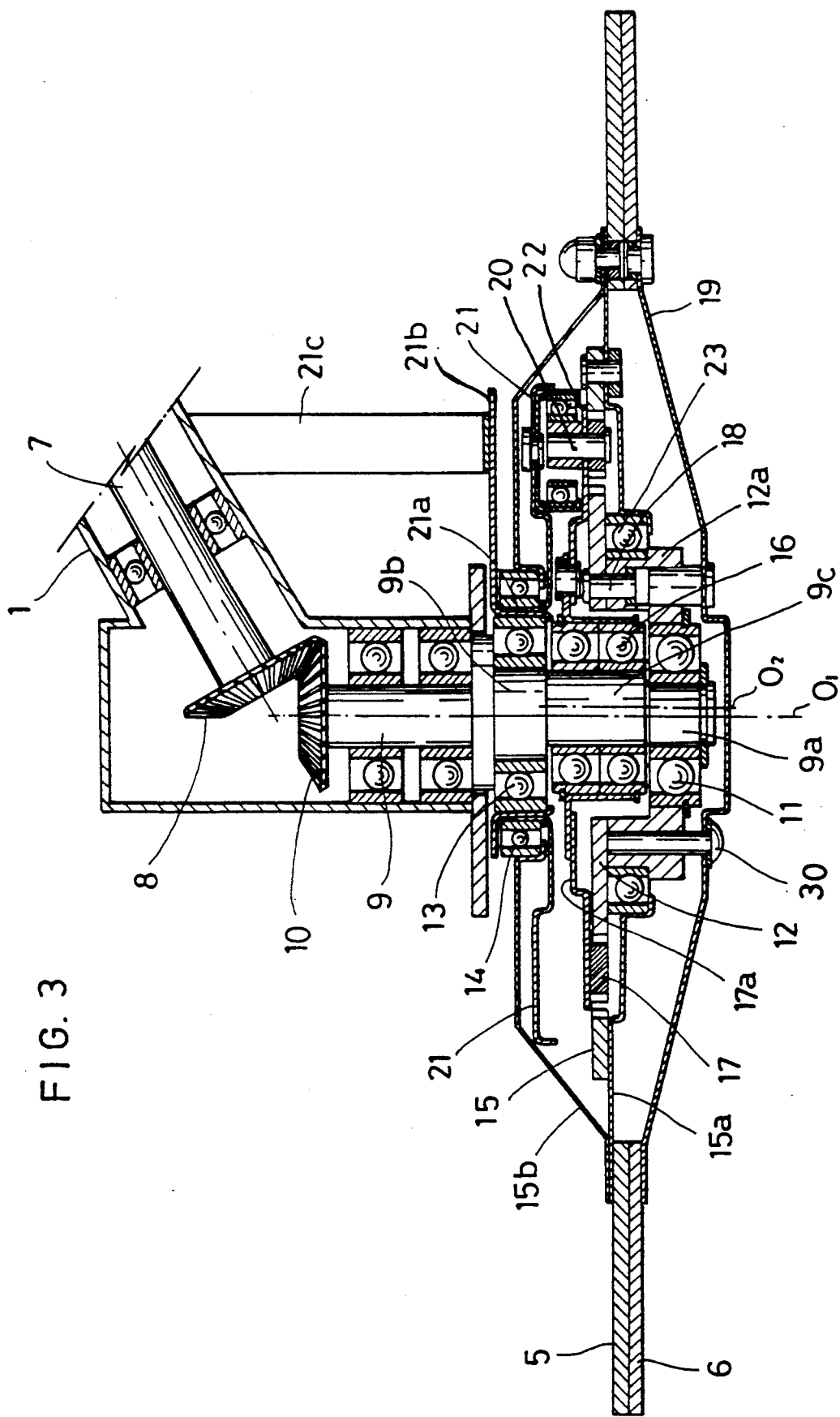
FIG. 3 is a vertical cross section of the mowing section of the mowing machine.

As seen in FIG. 3, the revolution of the engine 2 is transmitted via a bevel gear 8 which is provided at the head of transmission shaft 7 to another bevel gear 10 which is provided on a drive shaft 9 of the blade wheels. A flexible shaft can also be used to transmit the revolution of the engine to the drive shaft 9.

Furthermore, gears are supported at three positions toward the bottom end of the drive shaft 9 via bearings. More specifically, at the very bottom of the drive shaft 9 is a small gear 12 mounted via a bearing 11, at the upper position is a ring gear 15 mounted via bearings 13 and 14, and between the bearing 11 and bearings 13 and 14 is an annular gear 17 mounted via a bearing 16.

The axis of a lower shaft part 9a of the drive shaft, on which the bearing 11 is mounted, and the axis of a top shaft part 9b, on which the bearing 13 is mounted, are aligned on axis $O_1$, which is the central axis of the entire shaft 9. To the contrary, the axis $O_2$ of a middle shaft part 9c, on which the bearing 16 is mounted, is eccentric (or off the center axis $O_1$); therefore, when the drive shaft 9 makes one rotation, the annular gear 17 makes one eccentric revolution.

The small gear 12, which is a thin plate, is unitedly fastened to a supporting tube 12a via a screw 18. The small gear 12 and supporting tube 12a are as a single unit supported by the lower shaft part 9a via the bearing 11.

A bottom plate 19 is fastened to the supporting tube 12a using a screw 30, and the lower blade wheel 6, which is formed annular on the outer circumference of the bottom plate 19, is fastened thereto via a screw.

The annular gear 17 is machined to be a thin plate, and a holder 17a is fastened thereto. The center of the holder 17a is tube-shape, and the bearing 16 is installed in this tube-shaped center of the holder 17a.

The annular gear 17 is provided with four carrier pins 20 (see FIG. 5), which protrude upward and engage with a rotation-restricting disc 21. As a result, the annular gear 17 does not rotate concentrically but revolve eccentrically. More specifically, the rotation-restricting disc 21 is provided with bearings 22 having a larger diameter than that of the carrier pins 20 to allow for oscillation caused by the eccentricity of the middle shaft part 9c, in such a way that the bearings 22 match the carrier pins of the annular gear 17, with which bearings carrier pins 20 are engaged.

A tube 21a that is formed at the center of the rotation-restricting disc 21 engages, from below, with the outer circumference of the bearing 13 that engages with the top shaft part 9b of the drive shaft 9, and protrudes outward from the top, and from the outer panel 21b that protrudes outward, an arm 21c protrudes upward, and the arm 21c is connected to part of the handle 1, thereby fastening the rotation-restricting disc 21 so that it does not rotate concentrically. The bearing 14 engages with the outer circumference of the tube 21a of the rotation-restricting disc 21. The tube part of the rotation-restricting disc 21 is held between the outer circumference of the bearing 13 and the inner circumference of the bearing 14.

A supporting disc 15a is fastened to the bottom surface of the ring gear 15 that engages with the annular gear 17. On the outer circumference of the disc, the upper blade wheel 5 is linked and fastened by screws. This upper blade wheel 5 and the lower blade wheel 6 are designed so that they slide on each other. The inner circumference of the supporting disc 15a of the ring gear 15 is supported by the supporting tube 12a of the small gear 12 so as to freely rotate via a bearing 23.

In addition to the supporting disc 15a, a cover 15b is fastened to the annular gear 17 so as to cover the rotation-restricting disc 21 from above. While the center of the cover 15b engages with the outer circumference of the bearing 14, the outer circumference of the cover is fastened to the upper blade wheel 5. In other words, the upper blade wheel 5 is held by the supporting disc 15a and the cover 15b; and thanks to the bearings 14 and 23, the wheel 5 can rotate freely. Therefore, when the drive shaft 9 rotates, the upper blade wheel 5 and the lower blade wheel 6 are individually reduced at a large reduction ratio and rotate in the opposite direction.

Figure 4:
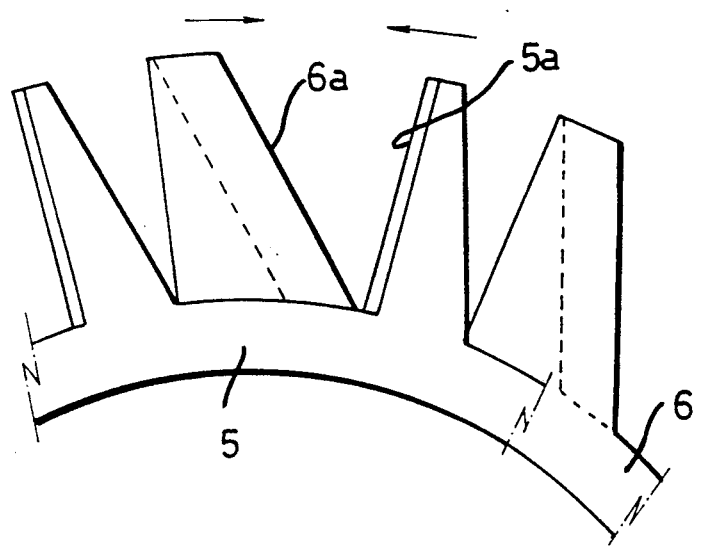
FIG. 4 is a top view showing a part of the upper and lower blade wheels provided with cutting edges.

The shapes of blades of the upper blade wheel 5 and the lower blade wheel 6 are not limited as long as they are shaped so as to be able to shear like scissors. Examples of the blades are shown in FIG. 4. In this embodiment, the upper and lower blade wheels are in both annular shape with blades protruding radially The cutting edges 5a and 6a that are at the forward end of the rotating directions are both slanted backwards from the rotating directions so that objects that cannot be cut and accidentally comes into between the cutting edges, are automatically pushed out. Furthermore, the clearance angles of the blade 5a of the upper blade wheel 5 and the blade 6a of the lower blade wheel 6 are different. In particular, the blade lengths of the blade 5a and blade 6a are different so that they cut an object when they pull in relation to the object.

Figure 5:
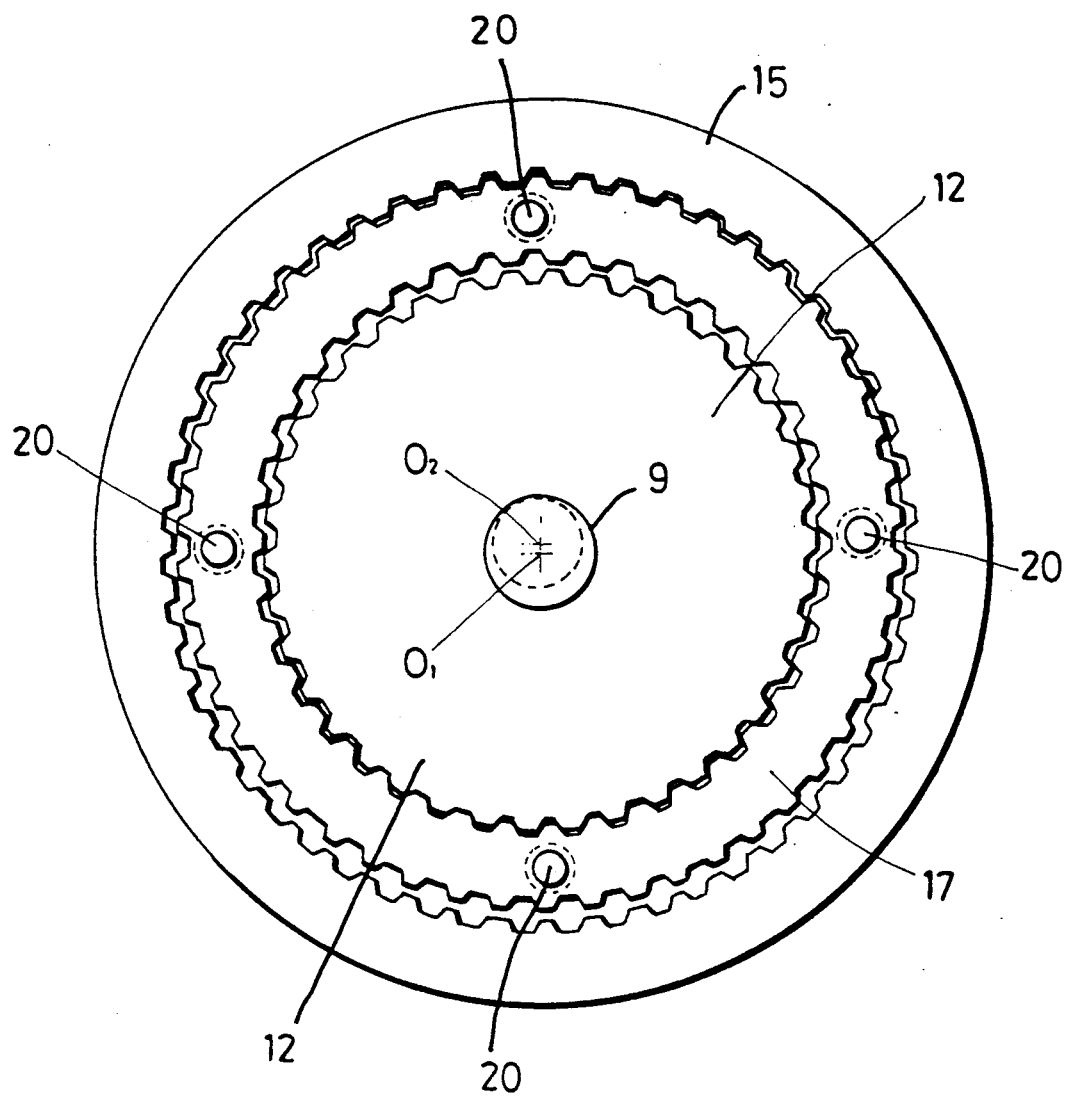
FIG. 5 is a top view showing a combination of spur gears that constitute a power-transmission mechanism.
Figure 6:
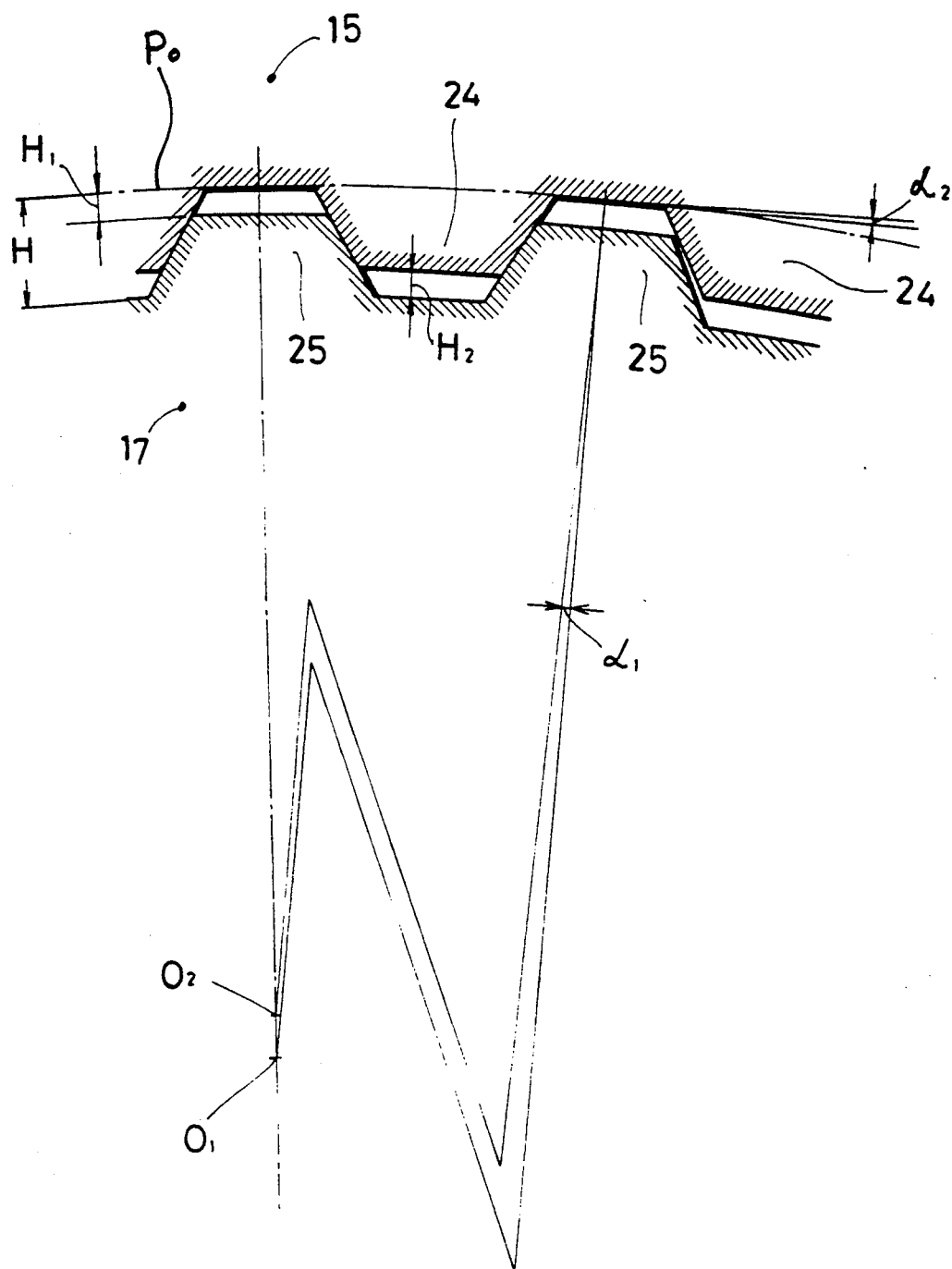
FIG. 6 is an enlarged schematic view showing a meshing condition of the gears of FIG. 5.

FIG. 5 is a top view showing an embodiment of the power transmission mechanism of the present invention with the use of a combination of spur gears, and FIG. 6 is an explanatory drawing showing a partially enlarged view of the same. The ring gear 15 is engaged with the outer teeth of the annular gear 17, and the small gear 12 is engaged with the inner teeth of the annular gear 17. All teeth have the same module, and the ring gear 15 has one tooth more than the annular gear 17, and the small gear 12 has one tooth less than the annular gear 17.

The ring gear 15 and the small gear 12 are both centered at $O_1$, and the annular gear 17 is centered at $O_2$, which is eccentric from $O_1$. Because the rotation of the annular gear 17 is restricted by the carrier pins 20, the annular gear 17 revolves eccentrically as the drive shaft rotates around the center $O_1$ with the distance between $O_1$ and $O_2$ as the radius.

The distance between the centers is determined by the difference between the number of the teeth of the gears and the module. The eccentricity in the combination of the ring gear 15 and the annular gear 17 must be the same as the eccentricity in the combination of the annular gear 17 and the small gear 12. The combination of the ring gear and the outer teeth of the annular gear and the combination of the inner teeth of the annular gear and the small gear respectively function as a relative reduction mechanism of internal planetary gears.

Generally, in an internal-planetary-gear mechanism, when a difference between the number of teeth is very small, for example just one, it is said that spur gears are not usable because of conflicts of the teeth. The inventor has devised a special tooth profile for each gear so that spur gear can be used. This will be explained with reference to FIG. 6, using the relationship between the ring gear 15 and the outer teeth of the annular gear 17.

The spur-gear tooth profiles 24 are formed on the ring gear, comprising inclined lines with a standard pitch circle $P_0$ as the tooth bottom. The other teeth 25 that match the above teeth are formed on the outer circumference of the annular gear 17. The tips of the teeth 24 and 25 are cut off for $H_1$ and $H_2$, respectively. This makes a plurality of teeth on the both gears, within a certain range from the meshing center, to engage with each other with surface-to-surface contact areas between them. As shown in FIG. 6, at one pitch distance from the center line running through centers $0_1$ and $O_2$ of the two gears, the ratio of $\alpha_1$, the difference between the center angles, to $\alpha_2$, the difference between the directions of the teeth is 2 to 1. By designing the engaging surfaces of the teeth 24 and 25 to be slanting surfaces with the ratio of the height to the circumferential length of 2 to 1, the contact area starts engagement while maintaining complete surface-to-surface contact, and the variation of the engagement depth generates surface sliding.

It is clear that the above teeth contact each other in a surface-to-surface fashion as explained below:

In FIG. 6, suppose the number of the teeth of the ring gear is $Z_1$, and the number of the teeth on the outer circumference of the annular gear is $Z_2$, the center angles of a ring-gear tooth and a corresponding annular-gear tooth at one-pitch distance from the center line are $Z_1/360°$ and $Z_2/360°$, respectively. Whereas the angles between a tangent of the pitch circle that is on the center line that runs through centers $O_1$ and $O_2$ and a line that connects the summits of the two adjacent teeth are $Z_1/180°$ and $Z_2/180°$, respectively. Therefore, the angle $\alpha 1$ is twice as large as angle $\alpha 2$, and if the contact areas of the teeth are designed to be slanting surfaces with the ratio of the height to the circumferential distance of 2 to 1, the contact area between the teeth 24 and 25 is always surface-to-surface.

A conflict between the teeth 25 and 24 can be avoided by cutting off their tips for $H_1$ and $H_2$, respectively. In the case of a standard spur gear, in which the pitch circle runs through the center of the height of a tooth, it is difficult to select such a cut-off dimension, but in the above embodiment, the cut-off dimension of a tooth is relatively small due to the relationship between the standard pitch circle $P_0$ and the tooth profile. The inventor was able to obtain a good result by cutting the tip of the tooth for 25% of the height of the tooth.

The mechanism of the teeth and meshing between the inner teeth of the annular gear 17 and the small gear is the same as that of the ring gear and the outer teeth of the annular gear.

Figure 7:
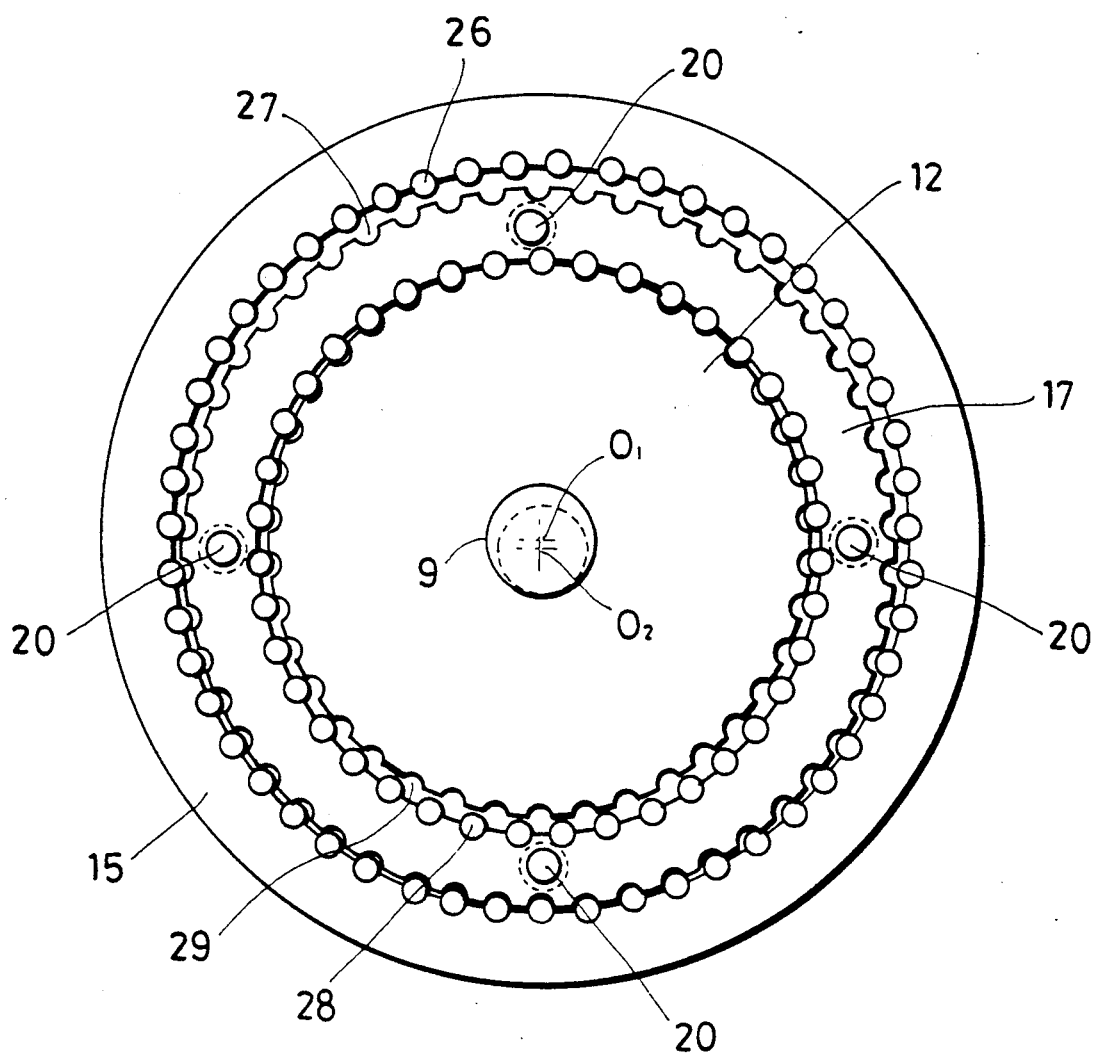
FIG. 7 is a top view showing a combination of gears of a circlute tooth profile that constitute a power-transmission mechanism.

The mechanism of the internal planetary gear itself, which is a combination of two gears, i.e., the driving gear and driven gear, is known. Circlute tooth profiles are known as tooth profiles that make smooth engagement. FIG. 7 shows an embodiment in which circlute tooth profiles, made by combinations of the circular teeth 26 and 28 and the concaves 27 and 29, are used respectively for the combination of the ring gear 15 and the outer circumference of the annular gear 17, and the combination of the inner teeth of the annular gear 17 and the small gear 12.

The gears shown in FIG. 7 use teeth of a circlute tooth profile as the power-transmitting teeth, but the spur-gear model shown in FIG. 6 is easy to manufacture, and the contact areas for power transmission are surface-to-surface without causing conflicts of teeth, thereby transmitting power efficiently. Therefore, it is possible to make a smaller and lighter power-transmitting mechanism.

As described above, the mowing machine of the present invention with a power-transmission mechanism made up with annular gear employs two blade wheels that rotate in the opposite direction to mow grass by shearing; therefore, grass and shrubs are certainly and cleanly mowed. Moreover, one drive shaft drives a combination of only three gears, which are reduced by large reduction ratios and rotate in the opposite direction form one another; therefore the revolution of a high-speed running engine can be directly used without a speed reducer, and as a result, it is possible to make a compact and light mowing machine.

The mowing machine of the present invention also allows the mowing position to be easily moved by making the lower blade wheel contact the ground, and the rotation of the upper blade wheel prevents cut grass and shrubs from accumulating on the blade wheel itself.

I claim:

1. A mowing machine using a power-transmission mechanism comprising a large ring gear with teeth on the inside, an annular gear having teeth on both inner and outer circumferences, and a small gear having the same axis as the large ring gear, in which: the ring gear and the annular gear are meshed with each other with a very small difference in the number of teeth between the ring gear and the outer circumference of the annular gear, the annular gear and the small gear are meshed with each other at an opposite position from said meshing position of the ring gear and the annular gear with a very small difference in the number of teeth between the inner circumference of the annular gear and the small gear; a drive shaft from a power source and an eccentric shaft coupled to the drive shaft on which a bearing is mounted to transmit the revolution of the shaft to the annular gear in a form of an eccentric revolution, while bearings are mounted on the drive shaft to support the ring gear and the small gear, one of which is fixed to an upper blade wheel and the other is fixed to a lower blade wheel, said upper and lower blade wheels rotate in opposite directions while sliding on each other.

2. A mowing machine using a power-transmission mechanism as defined in claim 1, in which: the ring gear is provided with teeth of an inclined-lined tooth profile with a standard pitch circle as the bottom, and the annular gear is provided on its outer circumference with teeth of an inclined-lined spur-gear tooth profile that mesh with said ring gear teeth; the annular gear is provided on its inner circumference with teeth of an inclined-lined tooth profile with a standard pitch circle as the bottom, and the small gear is provided with teeth of an inclined-lined spur-gear tooth profile that mesh with said inner circumferential teeth of the annular gear; all teeth have the same module, and their tips are cut off for a certain dimension; the difference in the number of teeth between the ring gear and the outer circumference of the annular gear, and the difference in the number of teeth between the inner circumference of the annular gear and the small gear are the same; and the upper blade wheel is fixed to either the ring gear or small gear and the lower blade wheel is fixed to the other of the two.

3. A mowing machine using a power-transmission mechanism as defined in claim 1, in which: circlute tooth profiles comprising a combination of circular teeth are employed respectively in a combination of the ring gear teeth and the outer circumferential teeth of the annular gear, and a combination of the inner circumferential teeth of the annular gear and the small gear teeth, and the upper blade wheel is fixed to either the ring gear or the small gear and the lower blade wheel is fixed to the other of the two.

* * * * *